United States Patent
Wu

(12) 
(10) Patent No.: US 6,182,988 B1
(45) Date of Patent: Feb. 6, 2001

(54) FOLDING DEVICE FOR A SCOOTER

(75) Inventor: Jack Wu, Taipei (TW)

(73) Assignee: Modas Shing Company Ltd., Taipei (TW)

(*) Notice: Under 35 U.S.C. 154(b), the term of this patent shall be extended for 0 days.

(21) Appl. No.: 09/596,485

(22) Filed: Jun. 19, 2000

(51) Int. Cl.$^7$ .................................................. B25G 1/04
(52) U.S. Cl. ................................. 280/87.05; 280/87.041
(58) Field of Search .................. 280/87.05, 87.041, 280/87.042, 87.03, 87.021

(56) References Cited

U.S. PATENT DOCUMENTS 4,707,884 * 11/1987 Chang ............................. 280/87.041
5,848,660 * 12/1998 Mc Green ......................... 280/87.05

FOREIGN PATENT DOCUMENTS

0003277 * 10/1909 (GB) ................................ 280/87.04
174175 * 1/1922 (GB) ................................ 280/87.05

* cited by examiner

Primary Examiner—Richard M. Camby
(74) Attorney, Agent, or Firm—William E. Pelton, Esq.

(57) ABSTRACT

A folding device for a scooter has a first extension attached to the head tube, a second extension attached to the base to partially receive the first extension, a hook pivotally received in the first extension and a compression lock having a shaft inserted through the first extension and the second extension and detachably connected with the hook, such that the user is able to use the connection of the hook to the shaft and the abutment of the eccentric head of the compression lock to the outer surface of the first extension to form a double safety feature.

5 Claims, 7 Drawing Sheets

FOLDING DEVICE FOR A SCOOTER

BACKGROUND OF THE INVENTION

1. Field of the Invention

The present invention relates to a folding device, and more particularly to a folding device for a scooter.

2. Description of Related Art

Normally, a scooter has a foldable handle, such that not much space is needed when the scooter is put away for storage. A conventional scooter usually includes a head tube, a base pivotally connected to the head tube, a front wheel assembly rotatably connected to the head tube and another wheel assembly rotatably mounted on the opposite end of the base. The pivotal connection between the base and the head tube is achieved by a combination of a bolt and nut whereby the bolt is inserted through both the base and the head tube, and the nut tightens and holds the head tube in position. With such an arrangement, at least two separated through holes are defined in the base. One hole is defined to hold the handlebar in an upright position relative to the base, and the other hole is defined to secure the handlebar in a horizontal or stowed position relative to the base. This type of scooter needs an extra tool(s) to open or fold the scooter, which makes the scooter inconvenient to the user.

Still, there is another type of conventional connection between the base and the head tube. This connection is achieved by a bolt and spring combination. With the bolt and spring combination, the user is readily able to change the relative position between the handlebar and the base. Although, the scooter has a convenient connection structure between the base and the handlebar, the connection is not as secured as it should be. When the scooter of this type is in use, the handlebar will shake and make the user standing on the base very unstable and unsafe.

With reference to FIG. 7, a conventional folding device for a scooter has a connector (3). a stud (6), a limit (51) and a spring (S). The connector (3) is securely connected to the base (A) and pivotally connected to a heat tube (5). The stud (6) is inserted through the connector (3) and the head tube (5) to enable the head tube (5) to pivot relative to the connector (3). The limit (51) is movably received in an arcuate opening (31) in the connector (3), The spring (S) is connected between the limit (51) and the stud (6). Furthermore, a notch (32) defined at each distal end of the arcuate opening (31) communicates with the arcuate opening (31), and the limit (51) is alternatively received in either one of the notches (32).

When the limit (51) is received in forward the notch (32), the head tube (5) stands in an upright position relative to the base (A), and when the limit (51) is received in the aft notch (32), the head tube (5) lies parallel to the base (A). When the limit (51) is moved between the two notches (32), the spring (S) applies a downward force to the limit (51), such that the limit (51) is pulled into and held in the notches (32). This secures the relative position between the heat tube (5) and the base (A). This kind of folding device does have the capability to fold and open the scooter. However there are still shortcomings that need to be overcome.

The friction between the limit (51) and the arcuate opening (31) when moving the limit (51) between notches (32) will enlarge the dimension of the arcuate opening (31) and damage the surface of the limit (51), which will cause the downward force from the spring (S) to be diminished. A sudden impact to the base (A) could cause the limit (51) to jump out of the notch (32) and the scooter to unexpectedly fold, which could be extremely dangerous especially at moderate to high speeds.

To overcome the shortcomings, the present invention provides a scooter with an improved folding device that allows the engagement between the head tube and the base to be secured when in use.

SUMMARY OF THE INVENTION

The main objective of the invention is to provide an improved folding device for a scooter. The folding device has a first extension extending down and out at an angle from the head tube and a second extension extending up from the base and corresponding to the first extension. The first extension has an elongated slot on each side aligning with a through holes defined in each ear extending from the second extension. The first extension is able to be inserted into the space between the two ears and is secured between the two ears by the engagement of a hook to a shaft.

Another objective of the invention is to provide an eccentric head pivotally connected with the shaft, such that the shaft inserted through the elongated slot and the through holes is able to be held in position by the eccentric head. Accordingly, the engagement between the head tube and the base is firmly secured.

Other objects, advantages and novel features of the invention will become more apparent from the following detailed description when taken in conjunction with the accompanying drawings.

DETAILED DESCRIPTION OF PREFERRED EMBODIMENT

Figure 1:
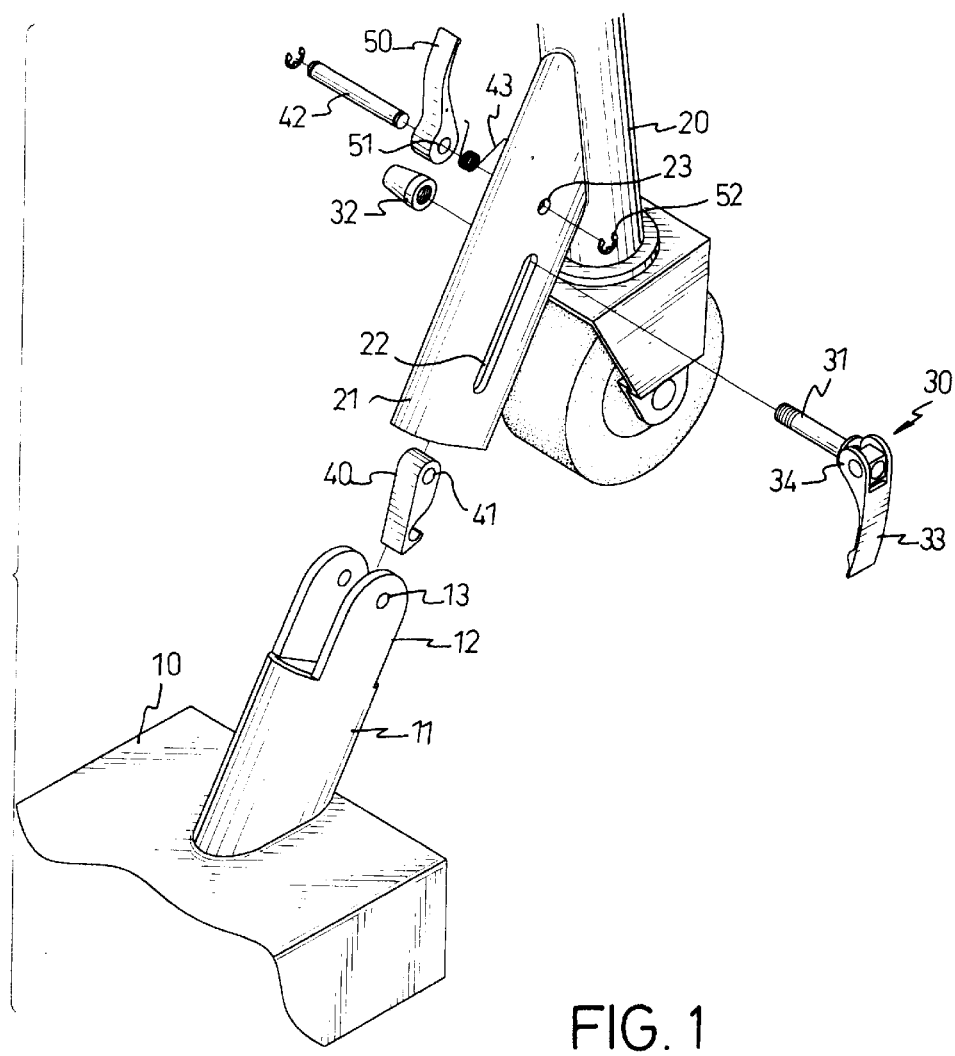
FIG. 1 is an exploded perspective view of the folding device for a scooter in accordance with the present invention.
Figure 2:
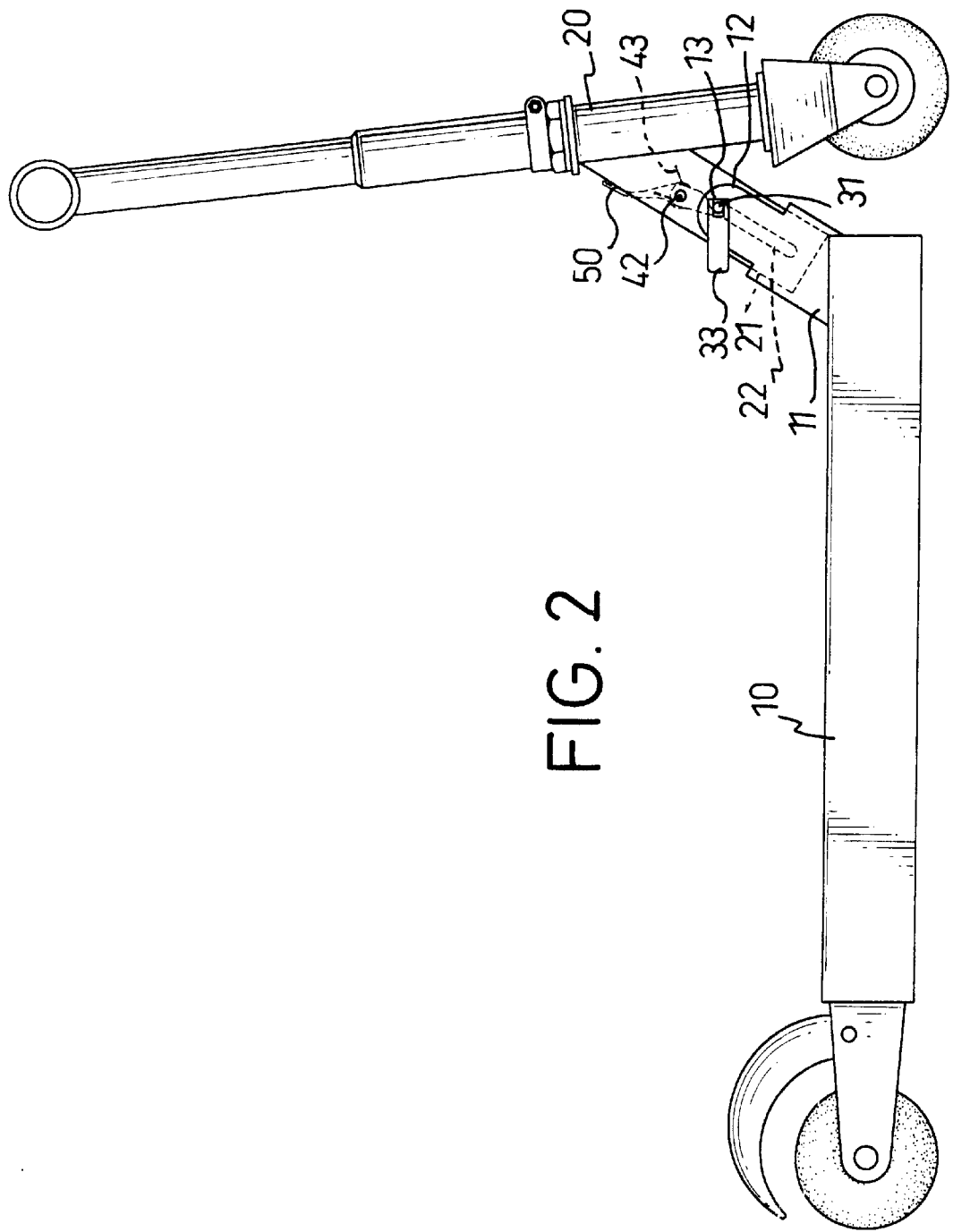
FIG. 2 is a side plan view of the folding device in FIG. 1 mounted between the head tube and the base of a scooter.
Figure 3:
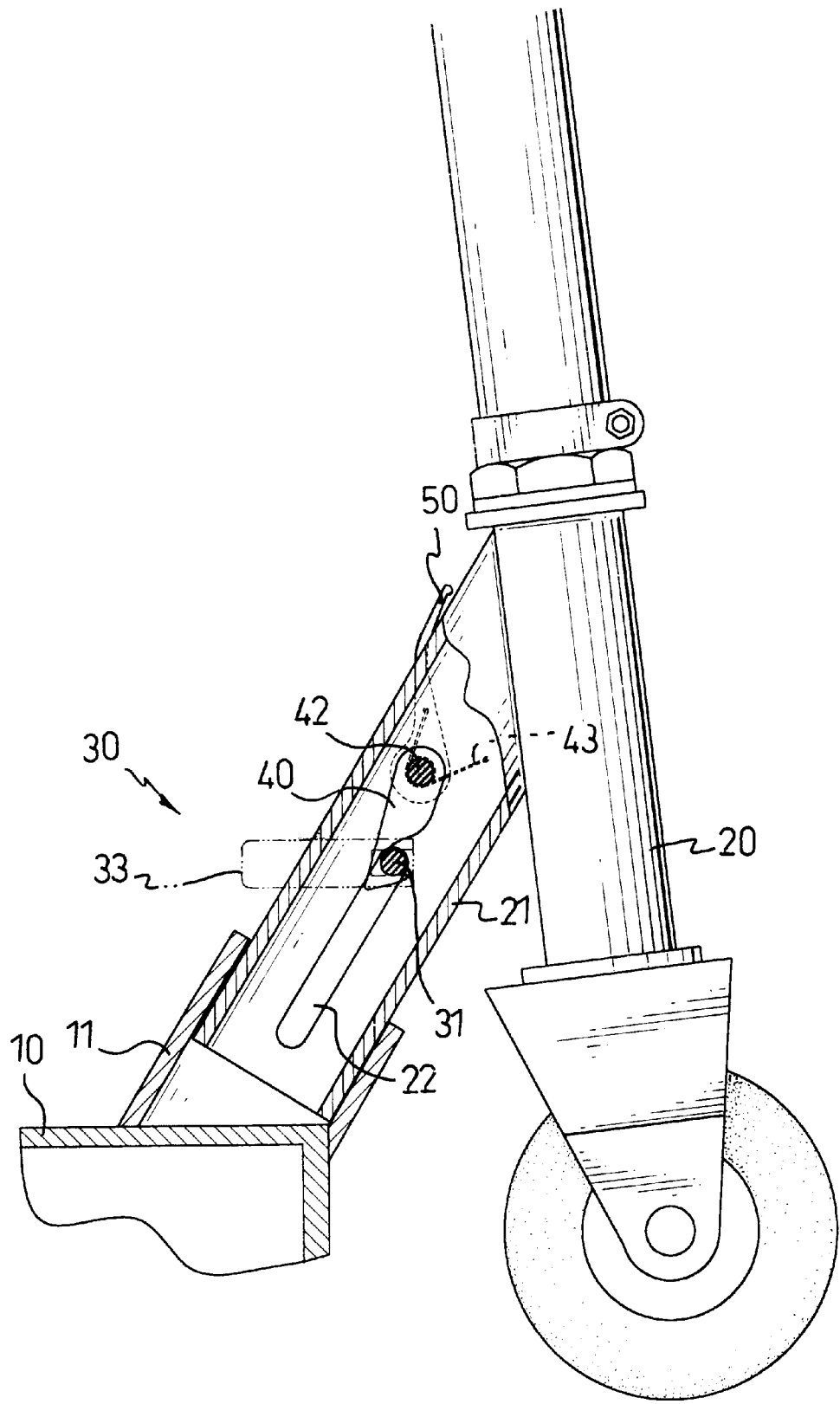
FIG. 3 is an enlarged side plan view in partial section of the folding device in FIG. 1 showing that the engagement between the head tube and the base is secured by the abutment of the eccentric head to an outer periphery of the first extension and the engagement of the hook with the shaft.

With reference to FIG. 1, the folding device in accordance with the present invention has a hollow first extension (21), a hollow second extension (11) extending at an angle up from the base (10), a compression lock (30), a hook (40) and a lever (50).

The first extension (21) extends at an angle out and down from the side of the head tube (20). The second extension (11) extends at an angle up from the base (10). The first extension (21) has an elongated slot (22) on each side, and the second extension (11) has a pair of ears (12) extending from the free end of the second extension (11). Each ear (12) has a through hole (13) defined to align with the corresponding elongated slot (22).

The compression lock (30) has a shaft (31), a nut (32) screwed onto the free end of the shaft (31) and a handle (33). An eccentric head (34) is formed on the end of the handle (33) that is attached to the shaft (31). The handle (33) is pivotally connected to the shaft (31) that corresponds to the elongated slot (22) in the first extension (20).

The hook (40) is received in the first extension (21) and has a pivot pin hole (41) defined to correspond to an aperture (23) on each side of the first extension (21). A pivot pin (42) is pressed through a hole (51) in the lever (50), inserted through the coils in a spring (43) and one of the apertures (23), pressed through the pivot pin hole (41) in the hook (40) and out the other aperture (23). The lever (50) assembly is held in place by a C-clip (52) at each end of the pivot pin (42). One free end of the spring (43) abuts the outer periphery of the first extension (21), and the other abuts the lever (50) to hold the hook (40) down. After the lever (51) and the hook (40) are mounted on the first extension (21), the hook (40) is able to pivot together with the lever (50).

The free end of the first extension (21) is inserted into the hollow second extension (11) so that the through holes (13) in the ears (12) align with the elongated slot (22) in the first extension. The compression lock (30) shaft (31) is inserted through the elongated slot (22) and the aligned through holes (13) in the ears (12) so that the shaft (31) is movably received in the elongated slot (22). The nut (32) is screwed onto the free end of the shaft (31). To further enhance the engagement of the compression lock (30) to the first extension (21), the eccentric head (34) abuts the outer surface of the first extension (21), such that the compression lock (30) is held in a desired location in the slot (22).

When the scooter with the folding device is in use, the hook (40) clamps the shaft (31) to provide a first safety feature to the user. Furthermore, the abutment of the eccentric head (34) to the outer surface of the first extension (21) provides a second safety feature to the user. It is because the abutment of the eccentric head (34) to the outer surface of the first extension (21) helps to position the compression lock (30) relative to the first extension (21), such that the connection of the hook (40) to the shaft (31) is improved.

Figure 4:
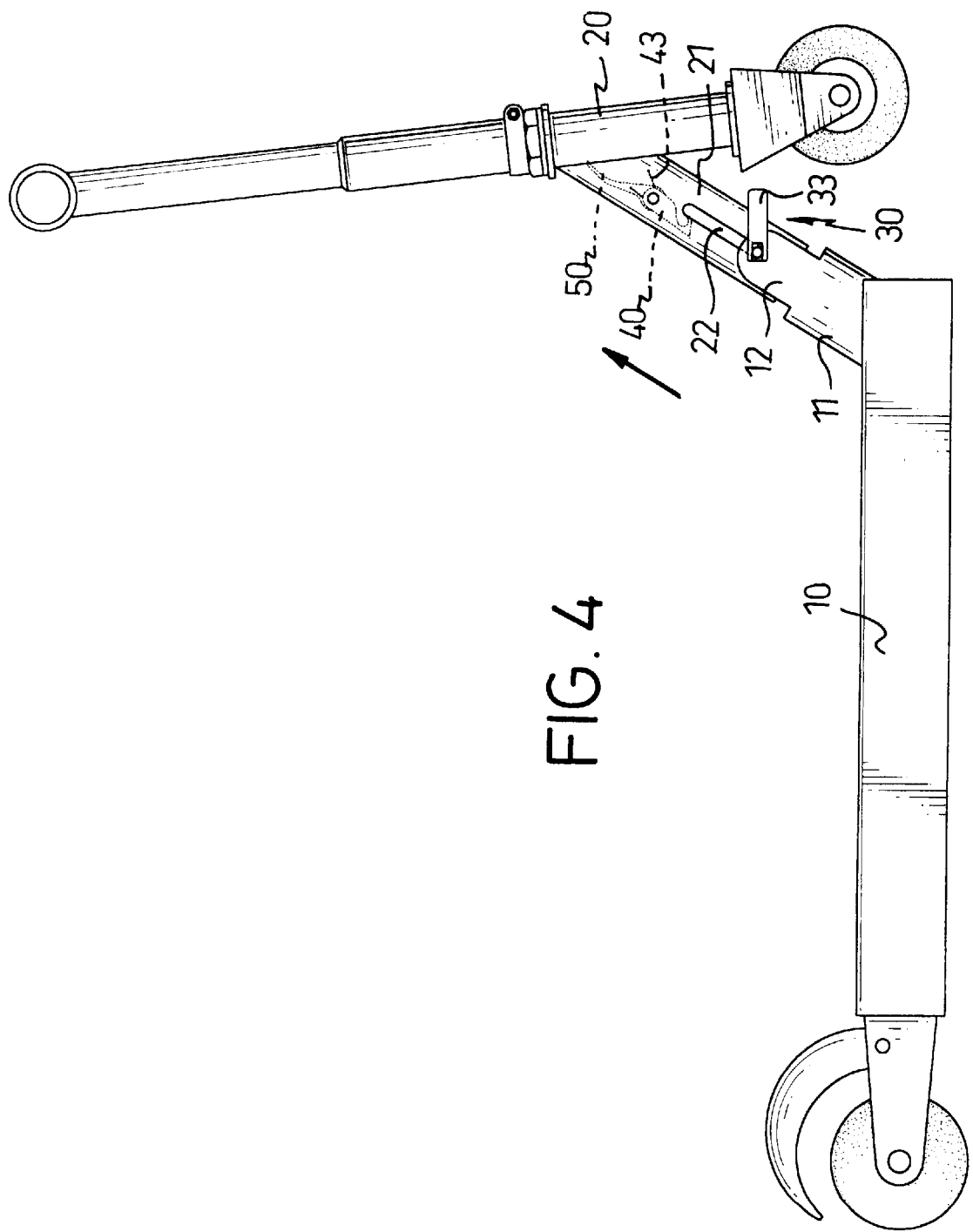
FIG. 4 is an operational side plan view of the folding device in FIG. 1 showing the disengagement of the parts in the folding device to allow the head tube to pivot relative to the base.
Figure 5:
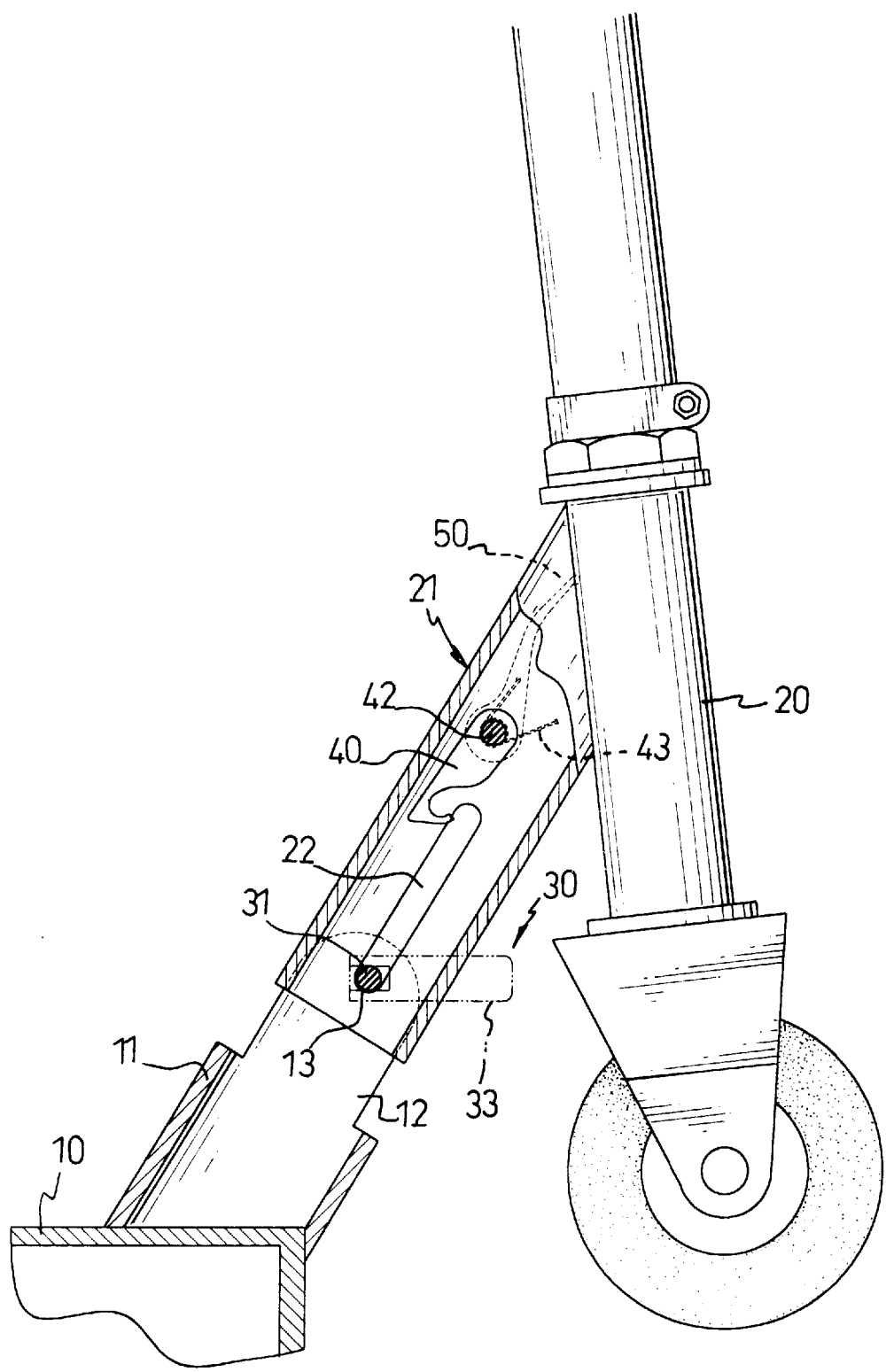
FIG. 5 is an enlarged operational side plan view in partial section of the folding device in FIG. 1, wherein the hook disengages the shaft so as to allow the head tube to pivot.
Figure 6:
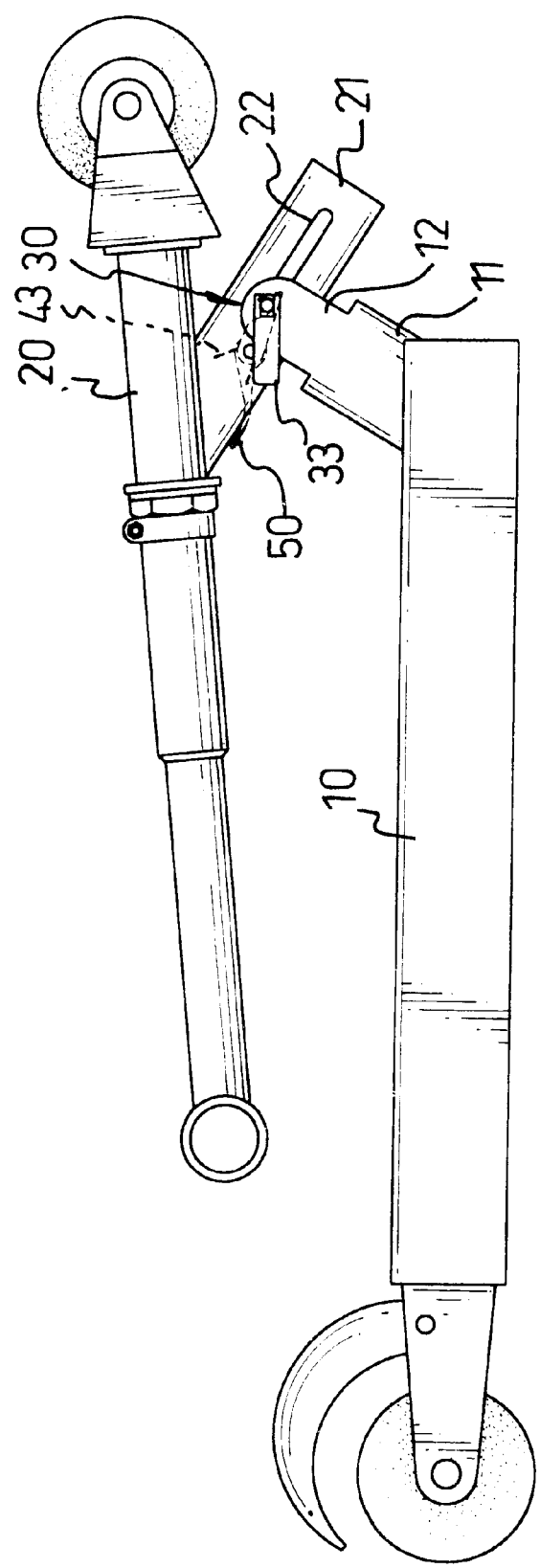
FIG. 6 is a side plan view of the folding device in FIG. 1 showing the head tube parallel to the base.
Figure 7:
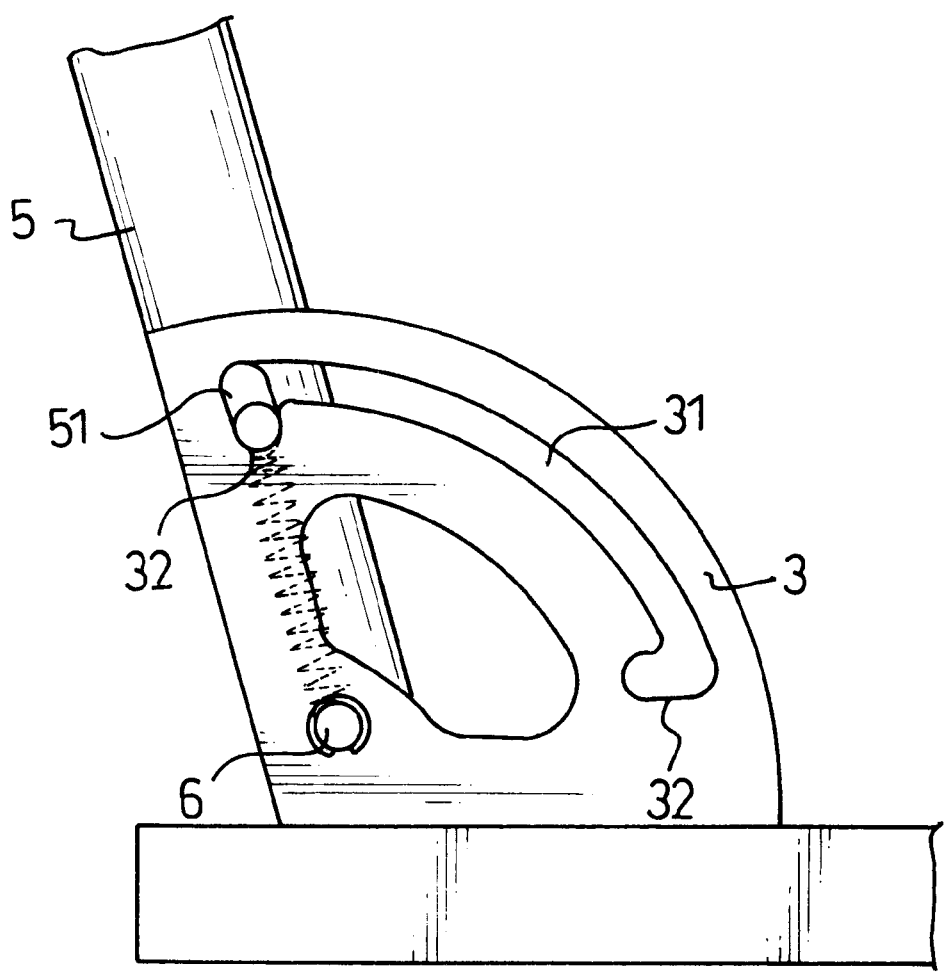
FIG. 7 is a side plan view of a conventional folding device for a scooter in accordance with the prior art.

When the scooter with the folding device is to be folded, the user first pivots the lever (50) to disengage the connection between the hook (40) and the shaft (31). Then the user pivots the handle (33) to release the eccentric head (34) from the outer surface of the first extension (21). Thereafter, the first extension (21) can be pulled away from the second extension (11) and pivoted relative to the second extension (11), as shown in FIGS. 4 and 5. After the first extension (21) is pulled away from the second extension (11), the first extension (21) is able to pivot relative to the second extension (11) to place the head tube (20) parallel to the base (10). Then, the user is able to use the hook (40) to connect the shaft (31) again and pivots the handle (33) to secure the position of the compression lock (30) to the first extension (21) to hold the scooter in a folded condition, as shown in FIG. 6.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A folding device for a scooter, the folding device comprising a hollow first extension attached to the head tube of the scooter and having an elongated slot on each side;

a hollow second extension attached to the base of the scooter to receive a free end of the first extension and having a pair of ears each provided with a through hole corresponding to the elongated slot;

a compression lock movably secured relative to the first extension and having a shaft extending through the elongated slot and the through holes of the pair of ears of the second extension; and a hook pivotally received in the first extension and disengagably connected with the shaft.

2. The folding device as claimed in claim 1, wherein the compression lock has a handle pivotally engaged with the shaft an eccentric head formed with the handle and a nut threadingly connected with a free end of the shaft, thereby after the nut is screwed onto the free end of the shaft that extends through the slot of the first extension, the pivotal movement of the handle allows the eccentric head to abut an outer surface of the first extension so as that the compression lock is held in position in the first extension.

3. The folding device as claimed in claim 2, wherein the hook further has a pivot pin inserted through a lever, an aperture in the first extension and a pivot pin hole defined in the hook, thereby allowing the hook to pivot along with the lever.

4. The folding device as claimed in claim 3, wherein a spring is mounted between the first extension and the lever to maintain the lever in a position at all times.

5. The folding device as claimed in claim 1, wherein a free end of the first extension is movably engaged with the second extension.

\* \* \* \* \*